US012654853B2

(12) United States Patent
Moore et al.

(10) Patent No.: US 12,654,853 B2
(45) Date of Patent: Jun. 16, 2026

(54) AIRCRAFT STRUCTURE

(71) Applicant: AMSL INNOVATIONS PTY LTD, Stanmore (AU)

(72) Inventors: Andrew Dudley Moore, Stanmore (AU); Alfred Leonard Swallow, Stanmore (AU)

(73) Assignee: AMSL INNOVATIONS PTY LTD, Stanmore (AU)

( * ) Notice: Subject to any disclaimer, the term of this patent is extended or adjusted under 35 U.S.C. 154(b) by 0 days.

(21) Appl. No.: 18/026,756

(22) PCT Filed: Sep. 17, 2021

(86) PCT No.: PCT/AU2021/051078
§ 371 (c)(1),
(2) Date: Mar. 16, 2023

(87) PCT Pub. No.: WO2022/056597
PCT Pub. Date: Mar. 24, 2022

(65) Prior Publication Data
US 2023/0339610 A1 Oct. 26, 2023

(30) Foreign Application Priority Data
Sep. 18, 2020 (AU) ................................. 2020903348

(51) Int. Cl.
*B64C 39/08* (2006.01)
*B64C 1/26* (2006.01)
(Continued)

(52) U.S. Cl.
CPC ................ *B64C 39/08* (2013.01); *B64C 1/26* (2013.01); *B64C 5/06* (2013.01); *B64C 29/0033* (2013.01);
(Continued)

(58) Field of Classification Search
CPC ........... B64C 39/068; B64C 5/02; B64C 5/06; B64C 1/26; B64U 30/40
See application file for complete search history.

(56) References Cited

U.S. PATENT DOCUMENTS 3,834,654 A 9/1974 Miranda
4,365,773 A 12/1982 Wolkovitch
(Continued)

FOREIGN PATENT DOCUMENTS

CN 204264444 U * 4/2015
CN 105416587 A * 3/2016
(Continued)

OTHER PUBLICATIONS

Oct. 26, 2021—International Search Report—Intl App PCT/AU2021/051078.
(Continued)

*Primary Examiner* — Joshua J Michener
*Assistant Examiner* — Ryan Andrew Yankey
(74) *Attorney, Agent, or Firm* — Banner & Witcoff, Ltd.

(57) ABSTRACT

An aircraft structure (10) comprising a fuselage (24), first and second forward wings (20, 22) mounted to and/or extending from opposing sides of the fuselage (24),
- a continuous rear wing span (34) defining first and second rear wings (30, 32) and a central static connecting portion (36),
- a first wing connecting member (42) extending between the first forward wing (20) and the first rear wing (30),
- a second wing connecting member (42) extending between the second forward wing (22) and the second rear wing (32),
- wherein the rear wing span (34) is supported by a centrally located V tail joint defined by first and second angularly inclined arms (100, 110),
(Continued)

first and second electric motors each having rotors, are mounted to each wing (20, 22, 30, 32), each rotor is pivotal between a first configuration for vertical flight, and a second configuration for forward flight.

8 Claims, 6 Drawing Sheets

(51) Int. Cl.

| | |
|---|---|
| *B64C 5/06* | (2006.01) |
| *B64C 29/00* | (2006.01) |
| *B64C 39/06* | (2006.01) |
| *B64D 27/31* | (2024.01) |
| *B64D 27/34* | (2024.01) |
| *B64C 3/14* | (2006.01) |

(52) U.S. Cl.
CPC ............ *B64C 39/068* (2013.01); *B64D 27/31* (2024.01); *B64D 27/34* (2024.01); *B64C 3/14* (2013.01)

(56) References Cited

U.S. PATENT DOCUMENTS

| | | | | |
|---|---|---|---|---|
| 4,674,712 | A | * | 6/1987 | Whitener .................. B64C 1/00 244/119 |
| 5,046,684 | A | | 9/1991 | Wolkovitch |
| 8,657,226 | B1 | | 2/2014 | McGinnis |
| 2015/0266571 | A1 | * | 9/2015 | Bevirt ................. B64C 29/0033 244/7 C |
| 2016/0304194 | A1 | * | 10/2016 | Bevirt ..................... B64C 11/28 |
| 2020/0407055 | A1 | * | 12/2020 | Mores ................... B64U 20/77 |

FOREIGN PATENT DOCUMENTS

| | | | | | |
|---|---|---|---|---|---|
| CN | 207072437 | U | | 3/2018 | |
| CN | 111225853 | A | | 6/2020 | |
| CN | 113613997 | A | | 11/2021 | |
| DE | 102015111032 | A1 | * | 1/2017 | |
| EP | 3335982 | A1 | | 6/2018 | |
| JP | 2017507843 | A | | 3/2017 | |
| KR | 20200057058 | A | | 5/2020 | |
| RU | 2146210 | C1 | * | 3/2000 | |
| WO | WO-2015143093 | A2 | * | 9/2015 | ............ B64C 27/28 |
| WO | 2016/048211 | A1 | | 3/2016 | |
| WO | 2019/056052 | A1 | | 3/2019 | |
| WO | 2019056053 | A1 | | 3/2019 | |
| WO | WO-2019211875 | A1 | * | 11/2019 | |
| WO | 2020040671 | A1 | | 2/2020 | |
| WO | 2020/186305 | A1 | | 9/2020 | |

OTHER PUBLICATIONS

Jul. 17, 2025—1st Office Action—CN Application No. 2021800639418.
Jul. 1, 2025—1st Office Action—JP Application No. 2023-517869.

* cited by examiner

AIRCRAFT STRUCTURE

CROSS REFERENCE TO RELATED APPLICATIONS

This application is a U.S. National Phase Application under 35 U.S.C. § 371 of International Application No. PCT/AU2021/051078, filed Sep. 17, 2021, which claims priority to Australian Application No. 2020903348, filed Sep. 18, 2020, which were published Under PCT Article 21(2), the entire contents of which are incorporated herein by reference.

TECHNICAL FIELD

The present disclosure relates to an aircraft structure. In particular, the present invention relates to an improved structure for box-wing aircraft, and more particularly vertical take-off and landing (VTOL) box-wing aircraft. However, it will be appreciated that the improved structure disclosed herein may be applied to other aircraft types.

BACKGROUND OF THE INVENTION

Aeroelasticity relates to the interactions between the inertial, elastic, and aerodynamic forces acting on an elastic body which is exposed to a fluid flow. One specific aspect of aeroelasticity is referred to as "flutter". Flutter relates to unconstrained vibration that can lead to the destruction of an aircraft. When designing aircraft structures, flutter must be taken into consideration.

Flutter relates to the dynamic instability of an elastic structure within a fluid flow, caused by feedback between the body's deflection and the force exerted by the fluid flow. In a linear system, the "flutter point" is the point at which the structure is undergoing simple harmonic motion—zero net damping—and so any further decrease in net damping will result in a self-oscillation and ultimate failure.

Structures exposed to aerodynamic forces, including wings and aerofoils, must be designed carefully within known parameters to avoid flutter. Changing the mass distribution of an aircraft or the stiffness of one component can induce flutter in an apparently unrelated aerodynamic component. Flutter can develop uncontrollably and cause serious damage or destruction of an aircraft.

Changes to mass distribution and local structural stiffness can be utilised to change the aircraft flight speed at which the flutter point is reached. In practice, an aircraft must be designed in such a way that the aircraft does not operate at or near the flutter point.

However, designing an aircraft to avoid catastrophic failure from flutter can be challenging, as small change to one parameter can have a material effect on the way the aircraft structure reacts at different flight speeds and conditions.

One method for reducing the risks of flutter point failure is to limit the maximum flight speed to a level significantly below the speed at which the flutter point will be encountered. However, this can be impractical, and in practice this may negatively impact the commercial viability of a given aircraft design, by undesirably limiting the maximum speed.

Another means of reducing the risk of operating the aircraft at or near the flutter speed is to increase the stiffness of the fuselage and in particular the wings. Whist such increases in stiffness are likely to raise the maximum operating speed at which the aircraft can safely operate without reaching the flutter point, a drawback is that the increase in stiffness is generally associated with an increase in weight. This has the drawback of reducing the maximum payload that the aircraft can carry, which unfortunately reduces the number of persons or the weight of cargo that can be transported. Again, this reduction in payload is undesirable, and may have an adverse effect on the overall commercial viability of a proposed aircraft design.

Box-wing aircraft or closed-wing aircraft are a specific type of aircraft in which there are typically two wings on each side of the aircraft which are connected to each other, either with struts/braces, or winglets at or near each wing tip, such that on each side of the aircraft, a forward and rearward (or alternatively upper and lower) wing are secured to each other with mechanical connections (in addition to the connection to the fuselage).

The box-wing structure can provide additional wing stiffness, which is beneficial with respect to flutter. However, there are specific problems and challenges associated with box-wing aircraft.

If the box wing aircraft has rotors mounted to each wing, there is an issue that the airflow which passes through the rotors mounted to the forward wings may negatively affect the rotors mounted to the rearward wings, due to the wake of the forward rotors effectively passing through the rearward rotors. As such, any vertical overlap between the swept area of the rotors of the forward and rearward wings can be noisy and also aerodynamically inefficient.

In certain box wing aircraft, the rear wings are mounted directly to the fuselage of the aircraft. This arrangement improves rigidity of the rear wings, which is favourable for raising the flutter point. However, this mounting arrangement often reduces the vertical clearance between the forward and rearward wings, potentially resulting in the aforementioned undesirable overlap between the swept area of the rotors of the forward and rearward wings. In addition, the mounting arrangement of the rear wings to the fuselage results in the central portion of the combined rear wing span being aerodynamically inefficient, due to the reduced length of wing available for producing lift.

In order to address the above noted drawbacks, it is known to secure the rearward wing to the fuselage in a vertical "T" type connection which physically and vertically separates the rear wing from the fuselage. This assists to raise the rear wing, and hence increases the vertical clearance between the forward and rear wings. This also increases the useable aerodynamic length of the wing for generating lift. However, the T connection is not optimal for flutter, as the stiffness of the rear wing mounting is reduced in this arrangement. As such, the aforementioned flutter issues may be problematic in this arrangement, which can undesirably reduce the maximum speed that the aircraft can operate below the flutter point.

WO 2019/211875 discloses a hybrid vertical take-off and landing aircraft. In the aircraft disclosed in that publication, there are separate rotors for the different flight states, e.g., take off and forward flight, such that ten of the rotors are fixed for vertical take off and landing, and two of the rotors tilt for cruising/forward flight.

WO 2019/211875 discloses a V-tail mounting arrangement in respect of the rear wing span, which is mounted to the rear of the fuselage with two angularly offset arms. One drawback with that system is that the span of the rear wing is not continuous, and it is shortened due to the V-tail connection to the fuselage, which is undesirable, as it reduces the length of wing available for generating lift, as there is no central portion of the rear wing span, and the rear wing span is composed of two independent wings.

OBJECT OF THE INVENTION

It is an object of the present invention to substantially overcome or at least ameliorate one or more of the above disadvantages, or to provide a useful alternative.

SUMMARY OF THE INVENTION

The present invention provides an aircraft structure comprising:

a fuselage;

first and second forward wings mounted to and/or extending from opposing sides of the fuselage, a continuous rear wing span defining first and second rear wings and a central static connecting portion, a first wing connecting member extending between the first forward wing and the first rear wing, a second wing connecting member extending between the second forward wing and the second rear wing, wherein the rear wing span is supported by a centrally located V tail joint defined by first and second angularly inclined arms, first and second electric motors each having rotors, are mounted to each wing, each rotor is pivotal between a first configuration for vertical flight, and a second configuration for forward flight.

Each of the first and second angularly inclined arms preferably has a proximal end secured to the fuselage and a distal end secured to the rear wing span.

Each of the first and second angularly inclined arms preferably has a proximal end secured to a common rear wing support, the rear wing support being secured to the fuselage, and a distal end secured to the rear wing span.

The span ratio, defined as the ratio of:

$$\frac{\text{the distance between a distal end of each arm}}{\text{the total length of the rear wing span}}$$

is preferably in the range of about 0.088 to 0.105

The first and second angularly inclined arms are preferably mounted to a rear bulkhead of the fuselage, and a tail cone is mounted to the rear bulk head, the tail cone covering at least a lowermost portion of each arm.

Each arm preferably has a proximal mounting portion which is located within the tail cone, and a distal exposed portion which extends above the tail cone.

The distal exposed portion preferably has an aerodynamic fairing on a leading edge.

An aerodynamic shield is preferably located at a junction where the distal exposed portion of each arm extends upwardly beyond the fuselage.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

Figure 1:
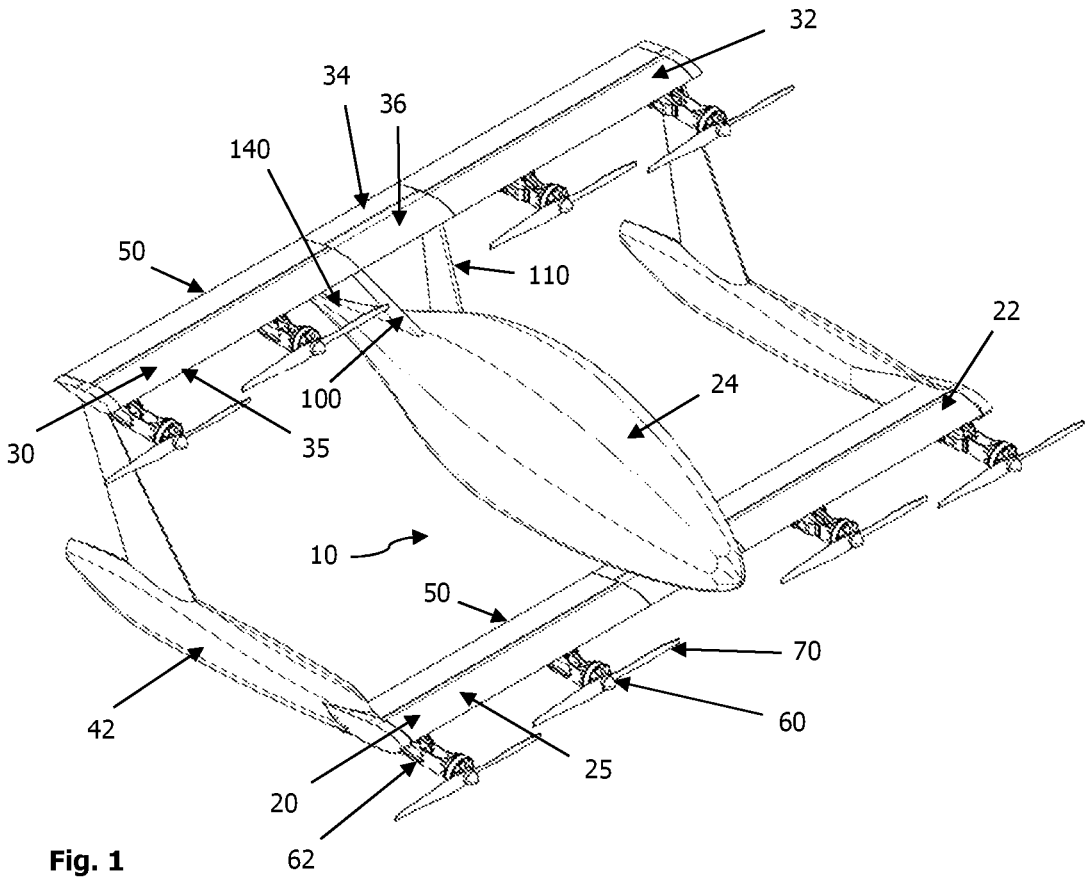
FIG. 1 is a front perspective view of an aircraft according to the invention.

A vertical take-off and landing (VTOL) box-wing aircraft 10 is disclosed. However, it will be appreciated that the invention may be applied to conventional box-wing aircraft, or other types of aircraft structures.

In the preferred embodiment, as depicted in the drawings, the aircraft 10 has two pairs of wings. Namely, the forward wings 20, 22 and the rearward wings 30, 32. Each of the forward wings 20, 22 is attached to a laterally opposing region of the fuselage 24, or alternatively extends through the fuselage 24, to define a single forward wing span. The rearward wings 30, 32 are defined by a continuously extending wing span 34 which is attached to the fuselage 24 with two arms as will be described.

In the embodiment shown in the drawings, the aircraft 10 is depicted as a single seat or double seat aircraft 10. However, larger multi-person embodiments are also envisaged. The aircraft 10 may be controlled from within by a pilot, or alternatively it may be remotely controlled.

In the embodiment depicted in the drawings, distal portions of the forward wings 20, 22 and the rearward wings 30, 32 are connected with wing connecting members or webs 42, such that the two pairs of wings 20, 22, 30, 32 define a box-wing or closed wing structure.

The wing connecting members 42 can be used to store batteries, fuel tanks, hydrogen tanks, or even cargo compartments. By locating mass such as batteries at the wing connecting members 42, the mass placement is optimal, and may improve flutter stability and increase flutter speed.

Fuel/energy/cargo stored in the connecting members 42 provides the following advantages:

configuration changes with minimum complication to other aircraft structures;

simple implementation of battery technology improvements, or other energy sources including hydrogen;

other operational advantages including battery hot swaps;

improved safety due to separation from wing surfaces and passenger compartments;

improved damage tolerance due to large separation between redundancy battery storage areas (on the wingtips).

Additionally, placing batteries in the wingtip connecting members 42 allows the wings to be optimized for aerodynamic efficiency, as opposed to volume efficiency (if the batteries were stored within the wings).

In another embodiment (not shown), the forward wings 20, 22 and the rearward wings 30, 32 may be strut braced wings, connected with tie bars or struts. A strut braced wing is generally lighter than a conventional cantilevered wing.

Whilst the aircraft 10 described herein is a box-wing or strut braced aircraft 10, it will be appreciated by those skilled in the art that the aircraft 10 may be a conventional cantilevered wing aircraft in which the forward wings 20, 22 and the rearward wings 30, 32 are separate and not interconnected.

Referring to the figures, the forward wings 20, 22 and the rearward wings 30, 32 are vertically separated, such that the forward wings 20, 22 are vertically positioned below the rearward wings 30, 32. The vertical separation is at least equal to and preferably greater than the diameter of one of the rotors, such that the diameters swept by the forward and rearward rotors are not vertically overlapping. In one embodiment, the rear wing is separated by more than one rotor radius to ensure clearance from the connecting member 42. In an embodiment where noise reduction is a clear goal, the vertical separation is such the rotors 70 located on the rear wings 30, 32 do not pass through the wake of the rotors 70 located on the forward wings 20, 22. This means the wing vertical separation is at least equal to one rotor diameter.

Preferably there are two rotors 70 on each wing, such that there are four rotors located along the combined forward wingspan, and four rotors 70 located along the total rear wingspan. Each rotor 70 is pivotal between a generally vertical axis take-off/landing configuration, and a generally horizontal axis forward flight configuration.

Each of the forward wings 20, 22 and the rearward wings 30, 32 has a fixed leading edge 25, 35. The leading edge 25, 35 has a curved profile, in the form of a portion of an aerofoil. The leading edge 25, 35 does not rotate or otherwise move relative to the fuselage 24.

The rear wings 30, 32 are defined by a continuous wingspan which extends continuously above the fuselage.

The (VTOL) box-wing aircraft 10 utilises a box wing design to reduce effects of wing tip vortices. In addition:

It uses rotors 70 mounted at (or near) the wingtips to actively suppress the creation of wingtip vortices, improving on the natural aerodynamic effect of the box wing.

It uses vertical aerodynamic sections at the rear of the box wing to increase directional stability.

Figure 2:
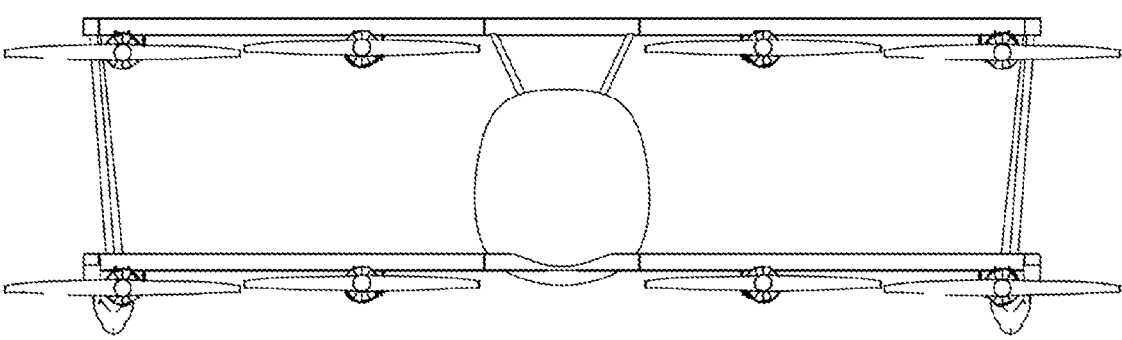
FIG. 2 is a front view of the aircraft of FIG. 1.

On the trailing side of each fixed leading edge 25, 35, the forward wings 20, 22 and/or the rearward wings 30, 32 have a pivotally mounted aileron or control surface 50. Each control surface 50 is pivotal between a generally vertical configuration for take-off and landing and a generally horizontal configuration for forward flight (as depicted in FIGS. 1 and 2).

In the preferred embodiment, the control surface 50 is a single surface which extends continuously along the full length (or at least the majority of the length) of the front wings 20, 22. Alternatively, each wing 20, 22, 30, 32 may have one or more independently pivotal control surfaces 50, such that the control surfaces 50 are capable of pivoting about the leading edge 25, 35, independent of the other control surfaces 50. For example, the rear wing span 34 has two control surfaces 50.

In the preferred embodiment, each rear wing 30, 32 has a single control surface 50, and the central region between the two wings 30, 32, located above the fuselage is fixed.

The vertical take-off and landing (VTOL) aircraft 10 includes a plurality of electric motors 60. Each motor 60 has a propeller or rotor 70. The body portion 62 of each motor 60 is mounted adjacent to the upper surface or the lower surface (as depicted) of the moveable control surface 50, generally in front of the fixed leading edge 25, 35. The control surface 50 is able to rotate though a range of between about 80 and 100 degrees, and preferably approximately 90 degrees for both horizontal flight mode and vertical flight mode.

The motors 60 may be mounted sufficiently forward of the fixed leading edge 25, 35 so that the rotor blades can fold rearwardly and remain clear of the wing structure. However, a preferred embodiment uses non-folding rotors 70 with a variable pitch mechanism. Fixed pitch blades may also be used.

There are two possible mounting arrangements for the motors 60 and control surface 50:
   a) Each motor 60 may be pivotally connected to one of the fixed leading edges 25, 35, and the control surface 50 is secured to the body portion 62 of the motor 60; or
   b) The control surface 50 may be pivotally connected to one of the fixed leading edges 25, 35, and the control surface is secured to the body portion 62 of the motor 60.

The electric motors 60 are each pivotal about the leading edge 25, 35 with the control surfaces 50 between a first position in which the rotor of each motor 60 has a generally vertical axis of rotation, and a second position in which each the rotor of each motor 60 has a generally horizontal axis of rotation.

All of the rotors 70 are moveable and un-fixed, meaning they can move between a generally vertical rotational axis for take-off and landing, and a generally horizontal rotational axis for forward flight. As such, there are no fixed rotors that are redundant during the cruising mode of operation.

Therefore, the (VTOL) box-wing aircraft 10 does not have any external feature that is not used in cruise flight creating unnecessary drag, such as redundant rotors. As such, the (VTOL) box-wing aircraft 10 operates in forward flight in its most aerodynamic configuration.

The rotors 70 on each wing surface are non-planar relative to each other, such that the axis of rotation of the motors are angularly offset. In this way the axis of rotation of adjacent motors is non-parallel such that the wing can be tilted using differential thrust.

This reduces the net torque required by the tiltwing actuators. This also assists tilting of the wing by producing moment on the tiltwing mechanism, and provides an additional layer of redundancy to tiltwing operations.

The (VTOL) box-wing aircraft 10 uses and maximises the blown lift phenomenon whereby:
   thrust from rotors enhances lift coefficient from wings, and
   The split tiltwing configuration maximises lift coefficient of wing at high angles of attack.

The (VTOL) box-wing aircraft 10 operates at triple redundancy throughout vertical and forward flight. It can operate in forward flight with multiple rotor failures as it typically uses 8× rotors for thrust and flight control.

The aircraft 10 has a V-tail arrangement for mounting the rear wing span 34. In particular, a central static member 36 of the rear wing span 34 is mounted to the fuselage 24 with two arms 100, 110 which are angularly separated relative to each other. The V-tail arrangement improves the aeroelastic performance of the aircraft 10 by increasing stiffness and thereby increasing the flutter point, enabling the aircraft 10 to operate safely at higher flight speeds. Each of the two arms 100, 110 provides a degree of diagonal bracing in addition to vertically supporting the rear wing span 34 above the fuselage 24.

The aircraft 10 utilizes a V-tail section attached to a continuous full span rear wing structure. The V tail design (with continuous full span wing structure) improves aeroelastic behavior, enabling the aircraft 10 to operate at higher cruise speeds.

The arms 100, 110 are preferably angularly separated relative to each other by an angle of about 19 degrees to about 26 degrees.

The optimal geometries allow for an inherent increase in stiffness at the joint between the arms 100, 110 and the rear wing span 34, ultimately delaying the occurrence flutter in a box-wing aircraft. The use of geometry to delay the occurrence of flutter to a higher speed allows for both a lighter aircraft and faster cruising speeds.

Potential modifications or improvements may involve additional geometric sensitivity analyses that could possibly influence the stiffness of a box wing aircraft, in relation to its flutter speed. One such analysis may involve an analysis in height-to-span ratio or in wing sweep angles. Similar geometric analyses could be applied to other configurations of aircraft.

Other possible developments of this invention could include this type of analysis in future design processes of box wing aircraft, with a set flowchart with the methodology.

As shown in FIG. 1, the rear wing span 34 includes a centrally positioned static member 36 which is located between the two rear wings 30, 32. The static member 36 has the cross sectional profile of an aerofoil, but the trailing region of the aerofoil is not moveable.

The rear wing span 34 of the aircraft 10 is attached to the tip of the V-tail arms 100, 110 at the underside of the static member 36.

Each of the arms 100, 110 may be independently secured with fasteners, bonded or welded to the rear bulkhead 105 (FIG. 5) of the fuselage 24, or a combination of one or more fastening techniques. Alternatively, the arms 100, 110 may be secured to another portion of the fuselage 24.

In an alternative embodiment, the two arms 100, 110 are integrally formed or secured to each other to define a single rear wing support 120, defined by a wish-bone or Y shaped component, having a single mounting point (or group of mounting points) to secure the rear wing support 120 to the fuselage 24.

A tail cone 140 is secured to the rear bulkhead 105 of the fuselage 24 such that the arms 100, 110 extend from an upper portion of the fuselage 24 between the interface between the tail cone 140 and the fuselage 24.

The arms 100, 110 may be secured to the static member 36 based on a set of possible span ratios (the ratio of the distance between the distal end of each arm 100, 110 in the V-tail to the length of the rear wing span 34) that allow for greater aeroelastic stiffness.

The aircraft 10 can be used on any box wing aircraft, including conventional and vertical Take-off and Landing arrangements. It comprises of a box-wing configuration with a V-tail empennage that allows the rear wing span 34 of the aircraft to be raised above the fuselage 23.

Figure 9:
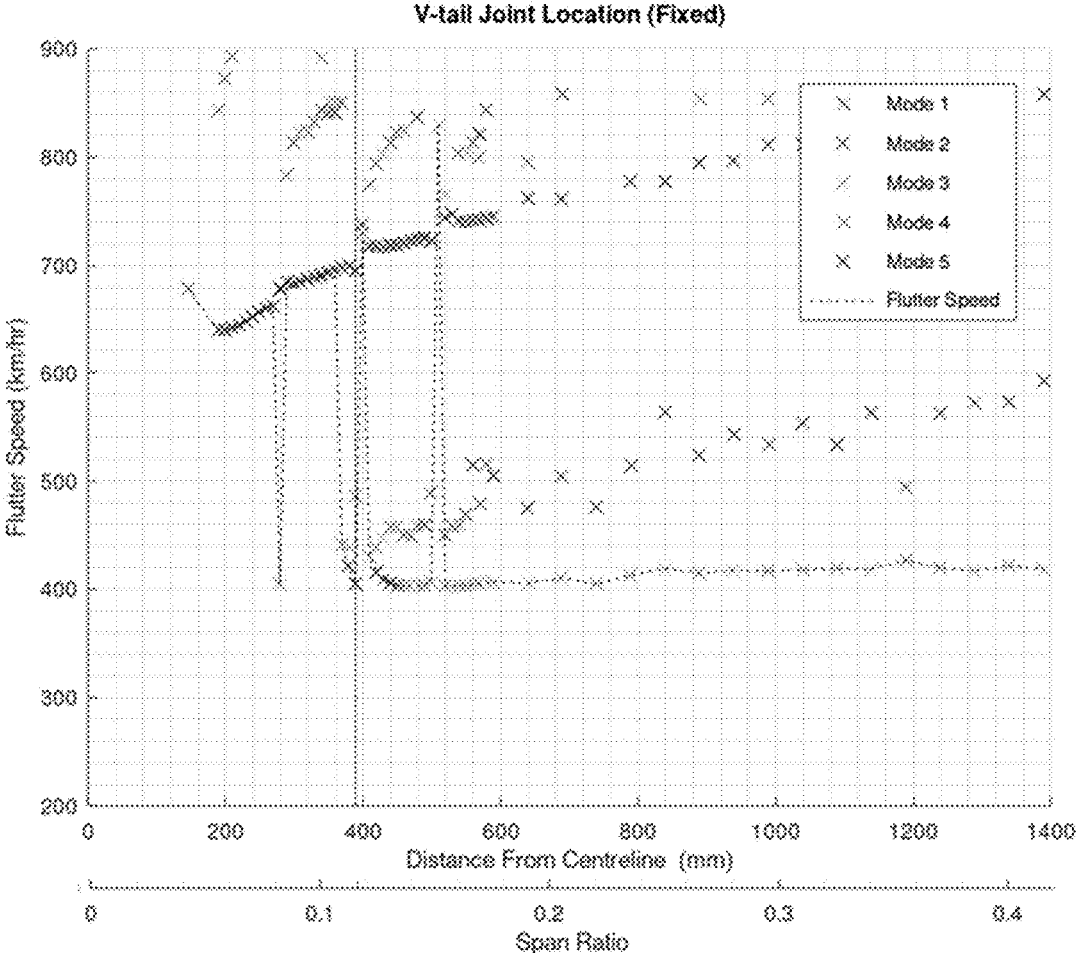
FIG. 9 is a table illustrating the results of the analysis showing the relationship between teh distance of the V-tail joint from the centerline and the flutter speed, as described in the written specification. .

Using the additional stiffness that the V-tail configuration adds to the rear wing span 34, a sensitivity analysis was performed by the applicant to determine the geometric effects that the V-tail angle has on the stiffness of the system and hence, flutter speed. A fixed connection between the rear wing span 34 and the V-tail arms 100, 110 was assumed. A variety of V-tail span ratios were analysed indicating an optimum range of 0.088 to 0.105 to provide a maximum flutter speed. For a V-tail span ratio greater than 0.105 the flutter speed drastically reduces. In the drawings, FIG. 9 illustrates the full results of the analysis.

The reason for these large drop offs exists due to the change in dominant flutter modes. This is due to the change in geometry slightly changing the shape, frequency and damping of the fundamental normal modes of the structure.

This aircraft 10 utilises the geometry of the V-tail to improve the aeroelastic performance of the aircraft.

Figure 4:
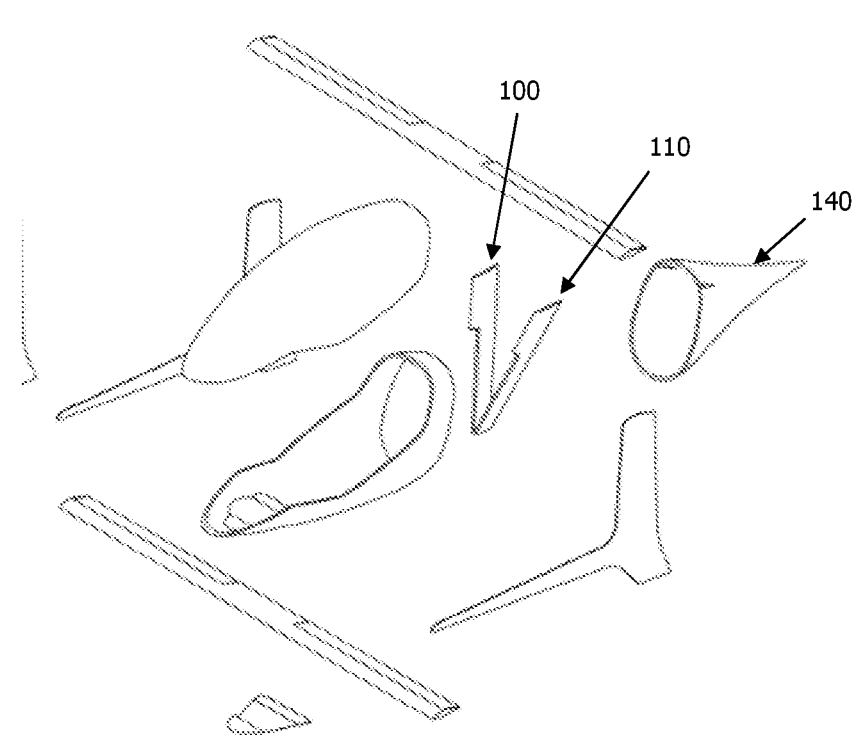
FIG. 4 is a schematic exploded view of the primary aerodynamic components of the aircraft according to one embodiment.

In the embodiment of FIG. 4, the V-tail arms 100, 110 may be joined at the proximal, lower end. Alternatively, the arms 100, 110 may be separately formed, but located in abutment or close to abutment at the proximal end.

Figure 5:
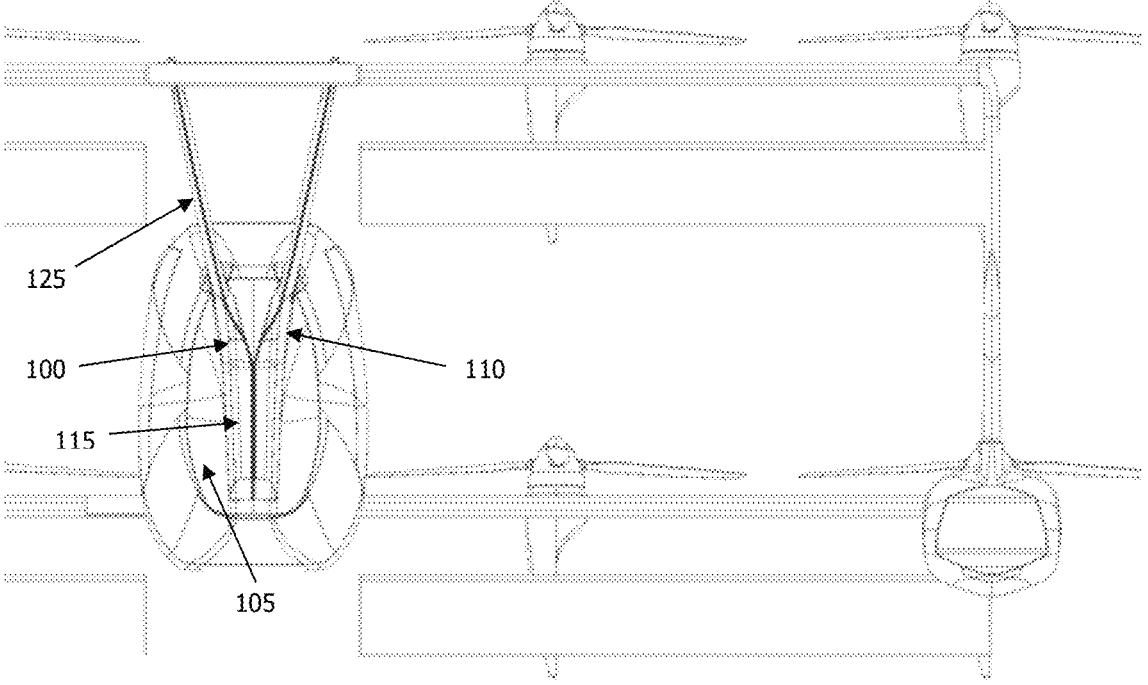
FIG. 5 is a rear view showing the V-tail according to a further embodiment.
Figure 6:
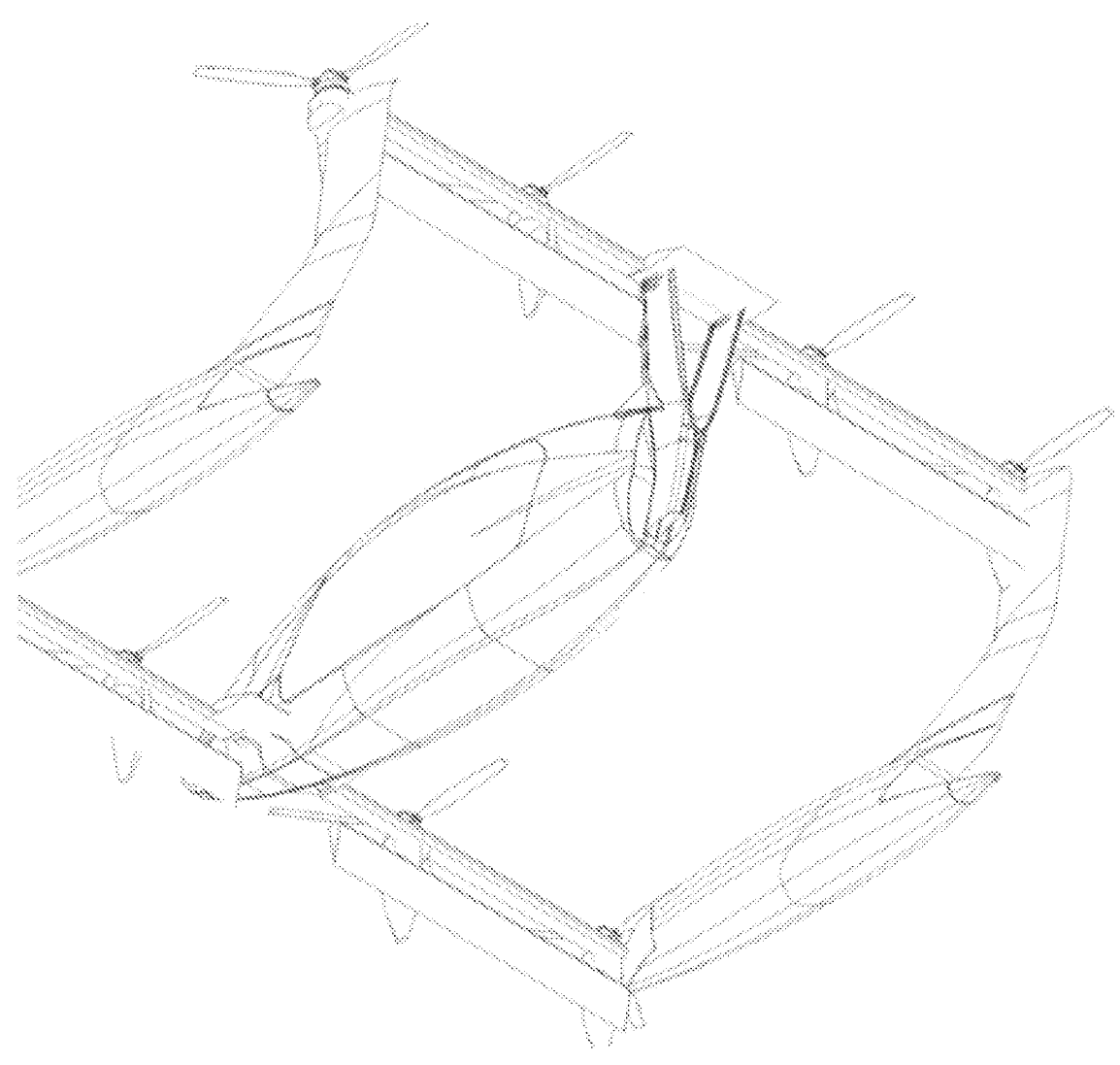
FIG. 6 is a rear perspective view showing the V-tail of FIG. 5.
Figure 7:
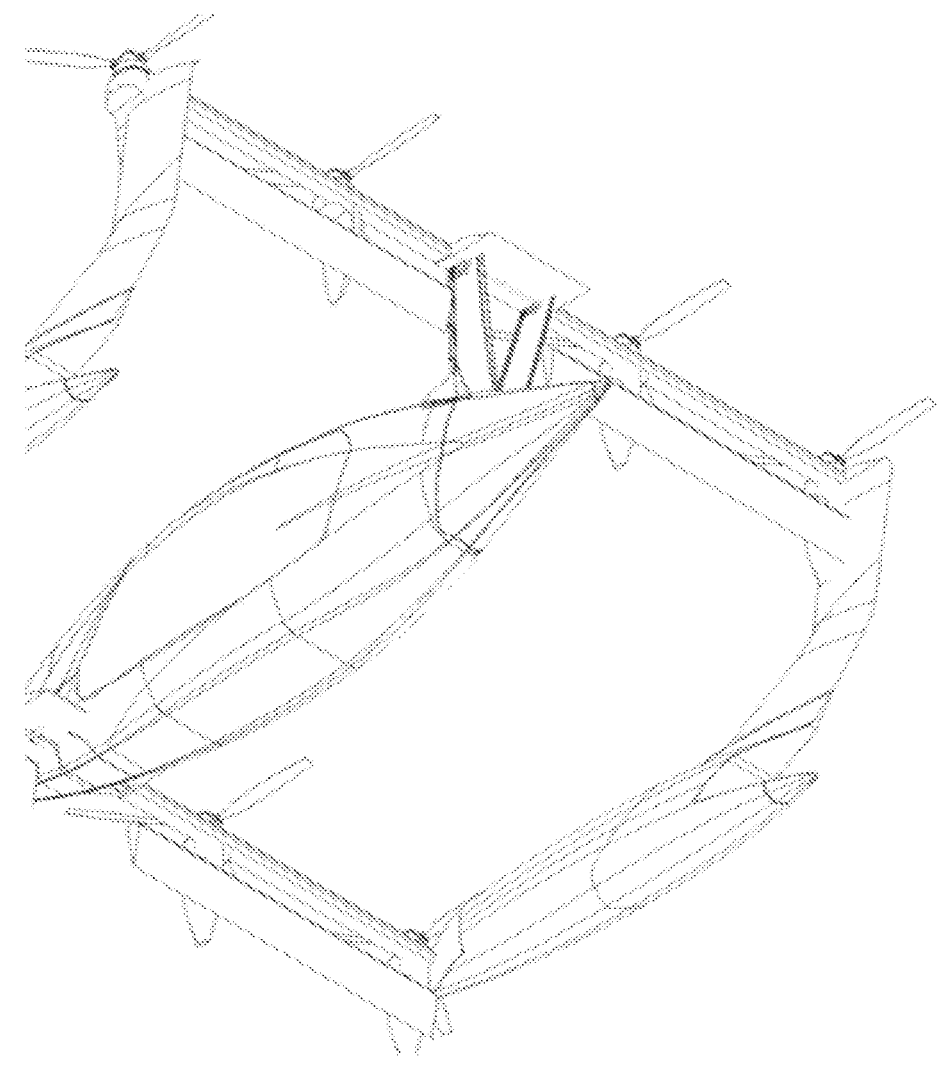
FIG. 7 depicts the V-tail of FIGS. 5 and 6 with the tail cone attached.
Figure 8:
FIG. 8 is a cross-sectional view of the tail.

In the alternative embodiment shown in FIGS. 5 to 7, the arms 100, 110 together provide a Y shaped tail support, and the arms 100, 110 are each defined by a proximal mounting portion 115 and a distal exposed portion 125. The mounting portion 115 is configured to be mounted to the rear bulkhead 105 of the fuselage 24. The two mounting portions 115 extend generally parallel to each other and are positioned in abutment with each other. In this way, the two mounting portions 115 can be secured to each other in addition to being secured to the rear bulkhead 105 for additional rigidity.

Figure 3:
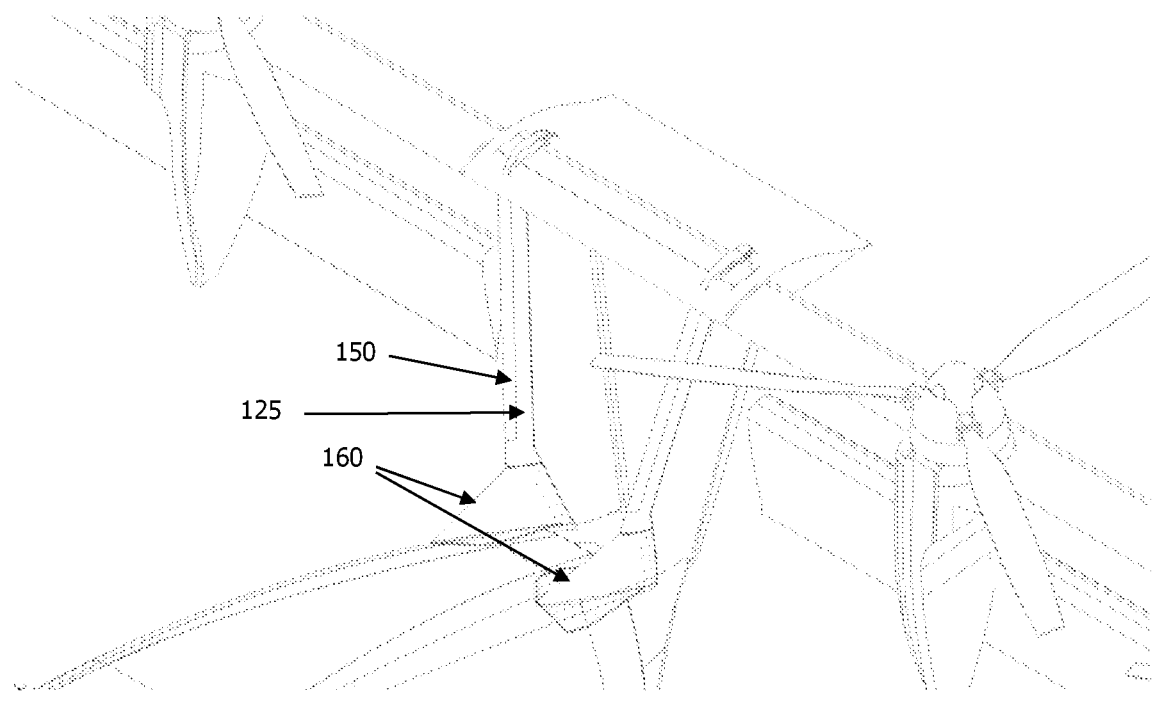
FIG. 3 is a perspective partial detail showing the intersection between the V-tail assembly and the fuselage.

The distal exposed portion 125 of each arm 100, 110 extends above the tail cone 140 and is exposed to the air flow during flight. The distal exposed portion 125 has an aerodynamic fairing 150 on the leading edge, as shown in FIG. 3. The upper most portion of the distal exposed portion 125 is mounted to the rear wing span 34.

Again referring to FIG. 3, an aerodynamic shield 160 is located at the junction where the distal exposed portion 125 of each arm 100, 110 extends beyond the fuselage 24. The shield 160 may be fastened, bonded, a combination of fastening and bonding, or otherwise secured to the fuselage 24.

The distal exposed portion 125 of each arm 100, 110 may tapers as shown in FIG. 3, such that the thickness (as measured a direction of forward flight) is narrowest near the interface with the rear wing span 34. Alternatively, the distal exposed portion 125 of each arm 100, 110 may be non-tapering, and have a generally uniform thickness.

The cross section of the right side arm 100 rotates clockwise slightly looking from above, as you move from tip toward the fuselage 24. In other words, the profile aligns with the flow at the joint to the wing and the trailing edge rotates inboard toward the fuselage 24. In a similar manner, the cross section of the left side arm 110 rotates counter-clockwise slightly looking from above, as you move from tip toward the fuselage 24.

Advantageously, the arms 100, 110 of the aircraft 10 ensure that the V-tail angle provides an effective amount of stiffness against flutter instabilities.

Although the invention has been described with reference to specific examples, it will be appreciated by those skilled in the art that the invention may be embodied in many other forms.

The claims defining the invention are as follows:

1. An aircraft structure comprising:
a fuselage;
first and second forward wings mounted to and/or extending from opposing sides of the fuselage;
a continuous rear wing span defining first and second rear wings and a central static connecting portion;
a first wing connecting member extending between the first forward wing and the first rear wing;
a second wing connecting member extending between the second forward wing and the second rear wing; and
first and second electric motors each having rotors, are mounted to each wing, each rotor is pivotal between a first configuration for vertical flight, and a second configuration for forward flight, wherein the rear wing span is supported by a centrally located V tail joint defined by first and second angularly inclined arms, and wherein the first and second angularly inclined arms are joined at a proximal lower end, and wherein the proximal lower end is mounted between a rear bulkhead of the fuselage and a tail cone such that the proximal lower end is internally housed in an internal cavity formed by the rear bulkhead and the tail cone.

2. The aircraft structure of claim 1, wherein each arm has a distal exposed portion which extends above the tail cone.

3. The aircraft structure of claim 2, wherein the distal exposed portion has an aerodynamic fairing on a leading edge.

4. The aircraft structure of claim 3, wherein an aerodynamic shield is located at a junction where the distal exposed portion of each arm extends upwardly beyond the fuselage.

5. The aircraft structure of claim 1, wherein the first and second angularly inclined arms are joined at the proximal lower end by a vertically extending mounting portion to form a Y-shaped tail support.

6. The aircraft structure of claim 1, wherein a span ratio is defined as a ratio of:

(a distance between a distal end of each angularly inclined arm)/(a total length of the rear wing span), and wherein the span ratio of the aircraft structure is in a range of about 0.088 to 0.105.

7. The aircraft structure of claim 1, wherein the first and second angularly inclined arms are angularly offset relative to each other by about 19 to 26 degrees.

8. The aircraft structure of claim 1, wherein each wing has a fixed leading edge and a pivotal trailing control surface.

* * * * *